United States Patent [19]

Watanabe

[11] 4,319,669
[45] Mar. 16, 1982

[54] DISC BRAKE DEVICE

[75] Inventor: Mamoru Watanabe, Tokyo, Japan

[73] Assignee: Watanabe Engineering Kabushiki Kaisha, Tokyo, Japan

[21] Appl. No.: 149,928

[22] Filed: May 14, 1980

[30] Foreign Application Priority Data

May 18, 1979 [JP] Japan .................................. 54-61747
May 31, 1979 [JP] Japan .................................. 54-67923

[51] Int. Cl.³ ....................... F16D 65/56; F16D 55/08
[52] U.S. Cl. ............................. 188/72.8; 188/196 BA
[58] Field of Search ............... 188/71.9, 72.8, 196 BA

[56] References Cited

U.S. PATENT DOCUMENTS

| | | | |
|---|---|---|---|
| 3,024,873 | 3/1962 | Wilkinson | 188/72.8 |
| 3,746,133 | 7/1973 | Hauth | 188/71.9 |
| 3,920,102 | 11/1975 | Ito | 188/72.8 |
| 3,976,168 | 8/1976 | Yamamoto | 188/72.8 |
| 4,050,549 | 9/1977 | Hori et al. | 188/72.8 |
| 4,162,720 | 7/1979 | Haraikawa | 188/71.9 |

Primary Examiner—Edward R. Kazenske
Attorney, Agent, or Firm—Armstrong, Nikaido, Marmelstein & Kubovcik

[57] ABSTRACT

An improved screw type disc brake device particularly adapted for a small type automotive vehicle is disclosed in which a male screw member of a relatively large screw lead is screw-engaged with a caliper arm supporting a movable friction pad so that thrust due to forward rotation of the male screw member is utilized as an urging force to bring the movable friction pad into pressure contact with the brake disc. An automatic gap adjustment device is interposed between the male screw member and the movable friction pad for providing the movable friction pad with an advance feed for every reciprocating rotation of the male screw member. A manual adjustment bolt is screw-engaged through the center of the male screw member for adjusting the position of backward movement of the movable friction pad via the automatic gap adjustment device.

1 Claim, 4 Drawing Figures

DISC BRAKE DEVICE

BACKGROUND AND SUMMARY OF THE INVENTION

This invention relates to a screw type disc brake device which is suitable for a vehicle, especially for a small type automotive vehicle such as a motorcycle, a snow-mobile and so forth. More specifically, the present invention relates to an improvement in a mechanical disc brake device wherein a male screw member of a relatively large screw lead having a brake operating lever fixed to the outer end thereof is screw-engaged with a caliper arm for supporting a movable friction pad and the thrust exerted by forward rotation of the male screw member by means of the brake operating lever is utilized as an urging force to bring the movable friction pad into firm pressure contact with the brake disc.

Generally, the disc brake device is provided with an automatic gap adjustment device for keeping the gap between the friction pad and the brake disc substantially constant at all times irrespective of the wear of the friction pad. When this automatic gap adjustment device is out of order, however, the prior art device has no means at all for adjusting the gap between the friction pad and the brake disc. This gap increases with increasing wear of the friction pad and increases the ineffective stroke of the brake operating lever.

To cope with the abovementioned problem, the first object of the present invention is to provide, in the abovementioned screw type disc brake device, a disc brake device which includes the automatic gap adjustment device for automatically adjusting the gap between the friction pad and the disc brake, as well as a device capable of manually adjusting the gap so that the gap can be properly adjusted by a simple manual adjustment, and the adjustment can be made at all times through a suitable actuation angle of the brake operating lever even when the automatic adjustment device is out of order.

In the disc brake device in general, further, the friction pad more or less experiences compressive deformation at the time of braking owing to the operation of a pad pressing device, and, as a result of the reaction, caliper arms of a brake caliper undergo elastic deformation that more or less spreads the caliper arms. The deformation of the kind described results in the apparent wear of the friction pad. If the automatic gap adjustment device is actuated in response to such apparent wear of the friction pad, this leads to so-called "over-adjustment", with the result that when the elastic deformation of the friction pad and brake caliper is restored upon releasing the brake, a sufficient gap no longer exists between the friction pad and the brake disc, whereby the friction pad gives rise to a strong drag phenomenon which is undesirable.

Accordingly, another object of the present invention is to provide a simple but effective automatic gap adjustment device which functions to prevent the "over-adjustment" in order to eliminate the abovementioned problem.

The above and other objects, features and advantages of the present invention will become apparent from the following detailed description of the invention when taken in conjunction with the accompanying drawings which illustrate a presently preferred embodiment of the invention.

DESCRIPTION OF THE PREFERRED EMBODIMENT

Figure 1:
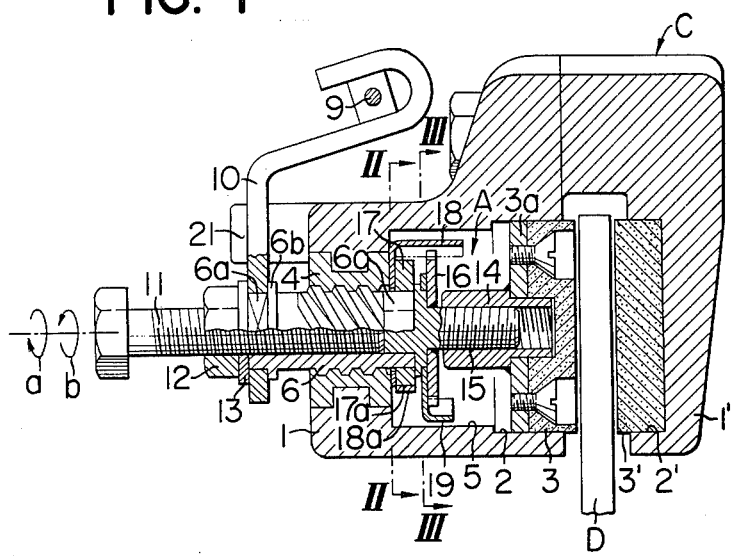
FIG. 1 is a longitudinal front view showing an embodiment of the device in accordance with the present invention.
Figure 2:
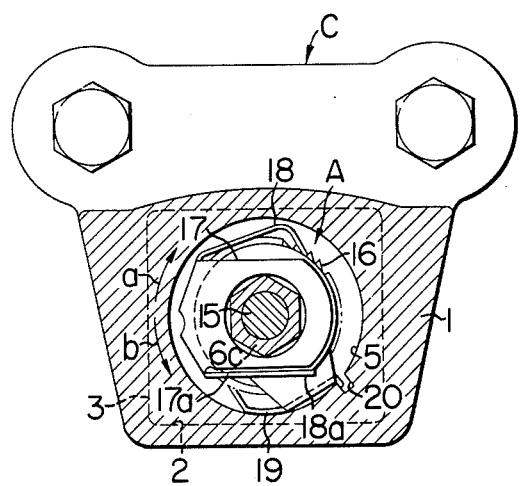
FIG. 2 is a sectional view taken along line II—II of FIG. 1.
Figure 3:
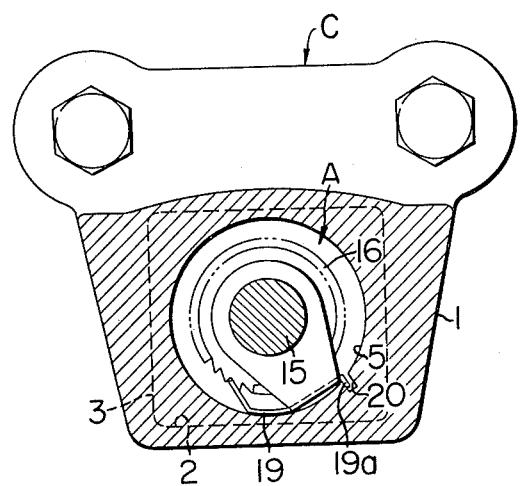
FIG. 3 is a sectional view taken along line III—III of FIG. 1.
Figure 4:
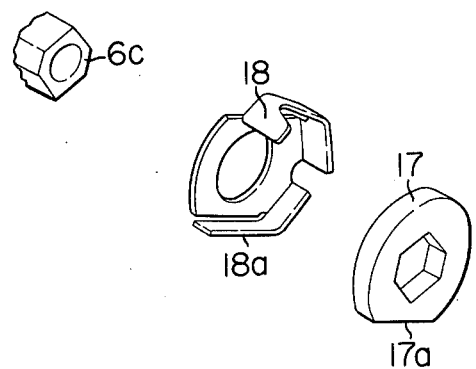
FIG. 4 is an exploded perspective view of a square shaft at the tip end of the male screw member, the driving member and the feed pawl to be used in the device of this invention.

Hereinafter, an embodiment of the device of this invention will be explained by referring to the accompanying drawings. In the drawings, reference symbol D represents a brake disc which rotates along with a wheel (not shown) of a vehicle and symbol C represents a brake caliper supported in a freely slidable manner in the axial direction of the brake disc D by means of a fixing bracket (not shown) secured to the vehicle body. The brake caliper is provided with a pair of clamp arms 1 and 1' that bridge over the outer circumferential portion of the brake disc from both right and left. Rectangular support holes 2 and 2' are bored to open on the internal side surfaces of both clamp arms 1 and 1', respectively, and a rectangular movable friction pad 3 opposing the left side surface of the brake disc D is slidably fitted into the support hole 2. Similarly, a rectangular fixed friction pad 3' opposing the right side surface of the brake disc D is fitted into the support hole 2'.

At the time of molding the left caliper arm 1, a female threaded nut member 4 is embedded in such a manner that a screw-threaded hole of this female threaded nut member 4 is open to both the outside surface of the caliper arm 1 and the inner end surface of a mechanism chamber 5 defined at the depth of the abovementioned support hole 2. A male screw threaded member 6 is engaged with this screw-threaded hole when it is rotated from outside and its inner end is projectingly inserted into the mechanism chamber 5. These members 4 and 6 are a right-hand nut and screw equipped respectively on their peripheral surfaces with multiple threads so that the male screw member 6 is able to produce a relatively large axial displacement with a slight rotational angle. These nut and screw members 4 and 6 form a pad pushing device of this invention.

At the outer end of the male screw member 6, there are formed integrally a square shaft 6a and a flange 6b at the base of this square shaft 6a. The base part of a brake operating lever 10, which is actuated by an operating lever 9 and a return spring not shown, is fitted into the square shaft 6a. Into the center of the male screw member 6 is fitted a manual adjustment bolt 11 from the outside. The adjustment bolt 11 is provided with a lock unit 12. When the lock nut 12 is fastened to both the square shaft 6a and the brake operating lever 10 via a washer 13, the brake operating lever 10, the square shaft 6a and the adjustment bolt 11 can be secured to one another.

The automatic gap adjustment device A of this invention, which is to be interposed between the male screw member 6 and the movable friction pad 3 inside the abovementioned mechanism chamber 5, is constructed in the following manner.

Namely, the automatic gap adjustment device A consists of a pressure-bearing plate 14 fixed to a back plate 3a of the movable friction pad 3, an adjustment screw 15 having its one end screw-engaged with a screw hole at the center of the pressure-bearing member 14 and the other end slidably and rotatably supported by the center hole of the male screw member 6, a ratchet wheel 16 secured at the center part of this adjustment screw 15, a driving member 17 fitted on the square shaft 6c formed at the inner end of the male screw member 6 and having on its outer circumference a flat driving surface 17a, a feed pawl 18 rotatably supported on the square shaft 6c adjacent this driving member 17 and engaging with the ratchet wheel 16 and a return stop pawl 19 rotatably supported by the adjustment screw 15 and engaging with the ratchet wheel 16. The feed pawl 18 is interconnected to the driving member 17 with a resilient escape arm 18a formed adjacent to the pawl 18 being engaged with the driving surface 17a. The return stop pawl 19 is prevented from rotating since a lock plate 19a formed adjacent to the pawl 19 is engaged with an anchor groove 20 on the internal surface of the mechanism chamber 5. The pawl portions of these pawls 18 and 19 are provided with compressive resiliency so as to be automatically engagable with, and disengable from, the ratchet wheel 16. Lead of the adjustment screw 15 is much smaller in comparison with that of the male screw member 6 and has a different screw direction from that of the latter 6.

In the drawings, reference numeral 21 represents a stopper that determines the limit of backward motion of the brake operating lever 10.

The operation of this embodiment will now be described. When the male screw member 6 is rotated in the forward direction a via the brake operating lever 10 by pulling the operation wire 9, the male screw member 6 undergoes axial displacement via the adjustment bolt 11 so as to press the adjustment screw 15 owing to the mutual engagement between the screw members 4 and 6. Along with the rotation of the screw member 6, the driving member 17 rotates and its rotational force is transmitted to the escape arm 18a engaging with its driving surface 17a and hence, to the ratchet wheel 16 via the feed pawl 18 with the consequence that the adjustment screw 15 integral therewith is actuated in the same forward rotating direction a. Thus the adjustment screw 15 rotates, thereby feeding the pressure-bearing member 14 incapable of rotation and hence, the movable friction pad 3, towards the brake disc D. As a result, the sum of the axial displacement of the male screw member 6 and the axial displacement of the pressure-bearing member 14 relative to the adjustment screw 15 becomes the displacement of the movable friction pad 3 towards the brake disc D and this displacement brings the movable friction pad 3 into pressure contact with the left side surface of the brake disc D, whereupon the brake caliper C moves the movable friction pad 3 in the direction opposite owing to the reaction, and brings the fixed friction pad 3' into pressure contact with the right side surface of the brake disc D via the caliper arm 1'. In this manner, the brake disc D is applied with a braking force due to the clamping action of both friction pads 3 and 3'.

During this braking process when both friction pads 3, 3' come into contact with the side surfaces of the brake disc D and a load torque exceeding a predetermined value is applied to the feed pawl 18, the resilient escape arm 18a undergoes suitable deflection to cause slippage with respect to the driving surface 17a even when the driving member 17 rotates thereafter in the forward direction a, and stops the feed pawl 18 from feeding the ratchet wheel 16.

Accordingly, even when elastic deformation occurs on both pads 3, 3' and the brake caliper C owing to the clamping action of both pads 3, 3' upon the brake disc D, the automatic gap adjustment device will never respond thereto.

When the operation wire 9 is released so as to overcome this braking, the brake operating lever 10 is rotated by a return spring (not shown) until it is supported onto the stopper 21. This causes the male screw member 6 to move backward in the axial direction while rotating in the reverse rotating direction b and returns it to its original position. However, since the ratchet wheel 16 is prevented from rotating in the direction indicated by b by the return stop pawl 19, the feed pawl 18 slides over the ratchet wheel 16 and does not prevent the abovementioned rotation of the male screw member 6.

Accordingly, the feed quantity of the pressure-bearing member 14 by means of the adjustment screw 15 during the abovementioned braking process is kept as such. Since the quantity of the backward movement of the movable friction pad 3 corresponds to that of the male screw member 6 in the axial direction, the position of the movable friction pad 3 after the release of the brake is at a position advanced by the feed quantity of the pressure-bearing member 14 by the adjustment screw 15, or, at a position closer to the brake disc D. This displacement of the movable friction pad 3 becomes a compensation quantity for the wear of both friction pads 3, 3' on account of the abovementioned braking.

In this manner, the gap between the brake disc D in the non-braking state and each friction pad 3, 3' is automatically adjusted to the level substantially equal to that prior to braking, and satisfactory braking action can be obtained at the time of subsequent braking on account of a suitable actuation angle of the brake operation lever 10.

When the automatic gap adjustment device A no longer operates normally due to damage of the feed pawl 18, for example, and the gap increases between the friction pads 3, 3' and the braking disc D due to the wear of these members, the lock nut 12 is first loosened and then the manual adjustment bolt 11 is so rotated as to suitably push forward the adjustment screw 15 at its tip, thereby allowing the wear of the friction pads 3, 3' to be compensated. After this adjustment, the lock nut 12 should naturally be returned again to its original tightened state.

As stated above, the brake device in accordance with the present invention includes the male screw member of a relatively large screw lead equipped at its outer end with the brake operating lever fixed thereto and screw-engaged with the caliper arm of the brake caliper supporting the movable friction pad, the automatic adjustment device interposed between the male screw member and the movable friction pad and providing the movable friction pad with an advancing feed for every reciprocating rotation of the male screw member, and the manual adjustment bolt screw-engaged through the center of the male screw member and capable of adjusting the position of backward movement of the movable friction pad via the automatic gap adjustment device.

Even when the automatic gap adjustment device is out of order, therefore, the wear of the friction pad can be compensated by the simple operation of rotating the manual adjustment bolt. This precludes a deterioration in braking due to excessive, ineffective stroke of the brake operating lever. It is also possible to optionally compensate for the excess or deficiency of the adjustment quantity due to the automatic gap adjustment device and to constantly keep the actuation angle of the brake operating lever at a proper level.

In accordance with the present invention, further, in the automatic gap adjustment device, the driving member rotating with the abovementioned male screw member and the feed pawl providing the adjustment screw with the advance feed via the ratchet wheel at the time of braking are interconnected with each other by engaging the resilient escape arm, which is integral with the feed pawl, with the flat driving surface on the outer circumference of the driving member so that when a load torque exceeding a predetermined level is applied to the feed pawl, the feed action of the feed pawl is stopped by means of deflection of the resilient escape pawl. According to this arrangement, it is possible to prevent excessive adjustment by the automatic gap adjustment device due to the elastic deformation of the brake caliper or the like and to eliminate the abnormal wear of the friction pads and the power loss of the vehicle. Nonetheless, the device is simple in construction and is economical to produce.

Although the present invention has been described with reference to a preferred embodiment thereof, it should be noted that the embodiment is illustrative only, and not restrictive, and that any change and modification may be made by those skilled in the art within the spirit and scope of the invention.

What is claimed is:

1. A disc brake device comprising: a male screw member of a relatively large screw lead equipped at its outer end with a brake operating lever fixed thereto, and screw-engaged with a caliper arm of a brake caliper supporting a movable friction pad; an automatic gap adjustment device interposed between said male screw member and said movable friction pad for providing said movable friction pad with an advance feed for every reciprocating rotation of said male screw member; a manual adjustment bolt screw-engaged through the center of said male screw member and capable of adjusting the position of backward movement of said movable friction pad via said automatic gap adjustment device; said automatic gap adjustment device being defined by a non-rotatable pressure-bearing member interconnected to said movable friction pad; an adjustment screw of a relatively small screw lead having its one end screw-engaged with said pressure-bearing member and the other coming into contact with said manual adjustment bolt; a ratchet wheel secured to said adjustment screw; a driving member fitted to said male screw member rotatably therewith and having a flat driving surface on the outer circumference thereof, a feed pawl interconnected to said driving member via a resilient escape arm engaging with said driving surface for engaging with said ratchet wheel and transmitting the rotation of said male screw member in the forward rotating direction to said ratchet wheel so as to provide said pressure-bearing member with advance feed at the time of braking; and a return stop pawl anchored to said brake caliper for engaging with said ratchet wheel and preventing the rotation of said ratchet wheel in the reverse rotating direction at the time of brake-release; wherein when a load torque exceeding a predetermined value is applied to said feed pawl during the rotation of said driving member in the forward rotating direction, the feed action of said feed pawl upon said ratchet wheel is stopped by means of deflection of said resilient escape arm.

* * * * *